Nov. 19, 1935.  J. C. McCUNE  2,021,798
FLUID PRESSURE BRAKE
Filed Dec. 3, 1930
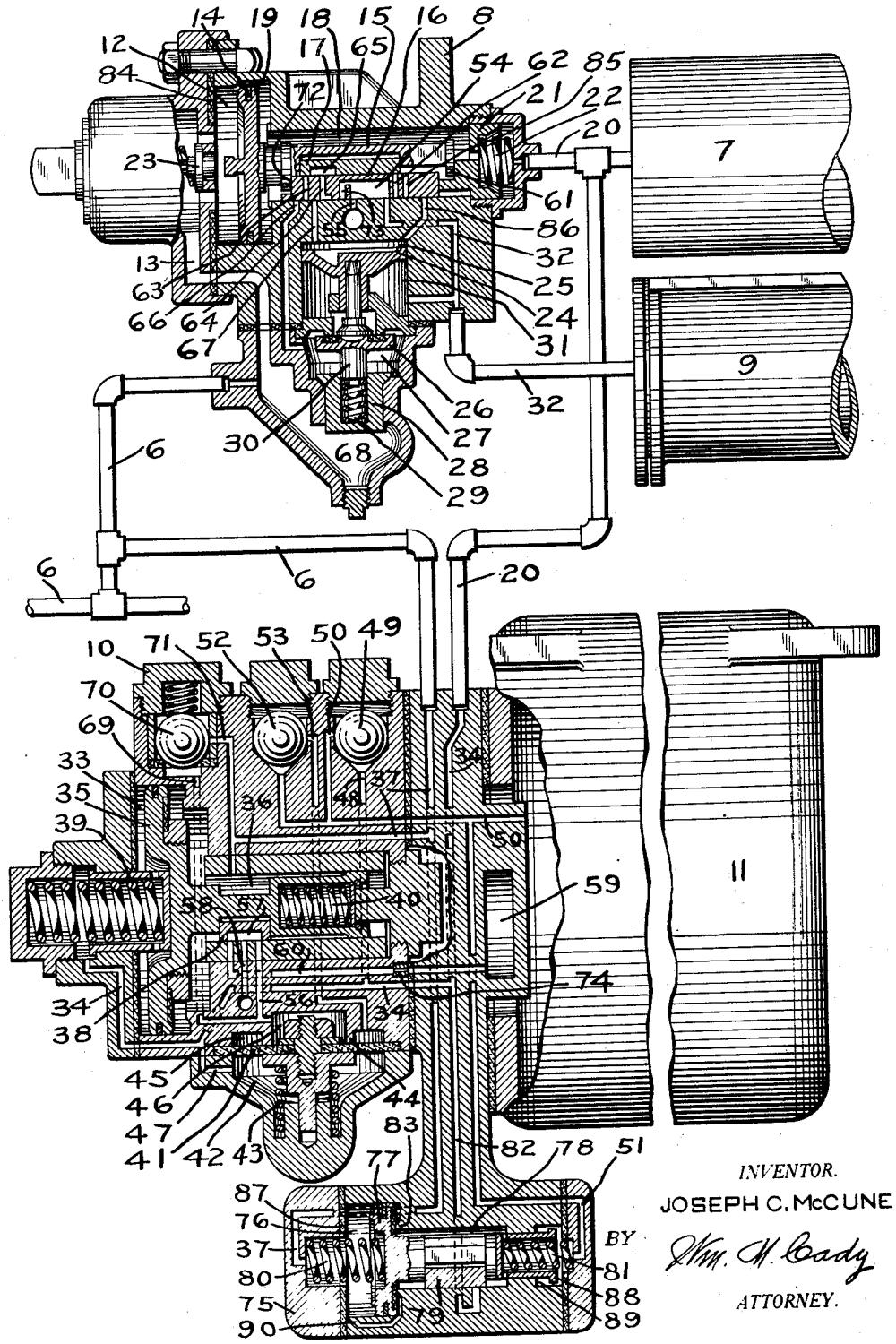
INVENTOR.
JOSEPH C. McCUNE
BY *Wm. M. Cady*
ATTORNEY.

Patented Nov. 19, 1935

2,021,798

UNITED STATES PATENT OFFICE 2,021,798

FLUID PRESSURE BRAKE

Joseph C. McCune, Edgewood, Pa., assignor to The Westinghouse Air Brake Company, Wilmerding, Pa., a corporation of Pennsylvania Application December 3, 1930, Serial No. 499,741

13 Claims. (Cl. 303—46)

This invention relates to fluid pressure brakes, and more particularly to a brake equipment in which the brakes are applied by effecting a reduction in brake pipe pressure and are released by increasing the brake pipe pressure.

An object of the invention is to provide an improved fluid pressure brake equipment in which means are provided for producing a high emergency brake cylinder pressure when an emergency application of the brakes is made.

Another object of the invention is to provide an improved fluid pressure brake equipment in which means are provided by which the brake pipe is quickly recharged after an emergency application of the brakes.

Another object of the invention is to provide an improved fluid pressure brake equipment of the character mentioned which is relatively simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawing, the single figure is a diagrammatic view of a fluid pressure brake equipment embodying the invention.

Referring to the drawing, the equipment may comprise a brake pipe 6, auxiliary reservoir 7, triple valve device 8, brake cylinder 9, quick service valve device 10, serial release reservoir 11, and a high pressure valve device 75.

The triple valve device 8 may be of well known construction and comprises a casing having a chamber 12 connected to the brake pipe 6, through a passage 13 and containing a piston 14 having a stem 15 adapted to operatively engage a main slide valve 16 and an auxiliary slide valve 17 contained in a chamber 18 connected to the piston chamber 12 through the usual feed groove 19 around the piston 14 and also connected to the auxiliary reservoir 7 through a pipe 20. Also contained in the valve chamber 18 is a retarded release stop 21 which is subject to the pressure of a spring 22 and which is adapted to be engaged by the end of the piston stem 15. Contained in the piston chamber 12 is the usual spring-pressed graduation stem 23 with which the piston 14 is adapted to engage.

The triple valve device 8 also comprises a quick action piston 24 contained in a chamber 25 and adapted to operate a quick action valve 26 contained in a chamber 27. Also contained in chamber 27, is a check valve 28 having a central bore containing a spring 29 with which a projection 30 on the valve 26 cooperates. The chamber 31 at one side of the quick action piston 24 is connected to the brake cylinder 9, through a passage and pipe 32. Passage 32 also leads to the seat of the main slide valve 16.

The quick service valve device 10 may comprise a casing having a piston chamber 33, connected through a passage 34 with the auxiliary reservoir pipe 20 and containing a piston 35 and having a valve chamber 36, connected through a passage 37 with the brake pipe 6 and containing a slide valve 38, adapted to be operated by piston 35.

On one side of the piston 35 there is a spring stop 39, while on the opposite side of said piston there is a spring stop 40, which is mounted in the valve chamber 36 and engages the end of the piston stem. The construction is such that when the device is in release position, as shown in the drawing, the piston 35 is held between the spring stops 39 and 40, and movement of the piston in either direction is opposed by said spring stops.

Also mounted in the casing of the quick service valve device 10, is a flexible diaphragm 41, having at one side a chamber 42 containing a spring 43 which urges said diaphragm into engagement with a seat rib 44 at the opposite side of the diaphragm, said seat rib separating an annular chamber 45 from a chamber 46 when the diaphragm is seated.

The high pressure valve device 75 may comprise a casing having a piston chamber 76, connected to the brake pipe passage 37 heretofore referred to and containing a piston 77 and having a valve chamber 78 connected through passages 50 and 51 with the serial release reservoir 11 and containing a slide valve 79 adapted to be operated by piston 77.

On one side of the piston 77 there is a spring 80, while on the opposite side of said piston there is a spring stop 81, which is mounted in the valve chamber 78 and engages the end of the piston stem. Since the piston 77 is held between the spring 80 and the spring stop 81, movement of the piston in either direction is opposed thereby.

In operation, when the brake pipe 6 is charged with fluid under pressure in the usual manner, fluid flows from the brake pipe through passage 13 to piston chamber 12 of the triple valve device 8 and shifts the piston 14 to release position, as shown in the drawing.

Fluid then flows from the piston chamber 12, through the feed groove 19 to valve chamber 18, and from valve chamber 18 through pipe 20 to the auxiliary reservoir 7, thus charging the auxiliary reservoir 7, and the valve chamber 18.

Fluid also flows from the pipe 20, through passage 34 to the piston chamber 33 of the quick service valve device 10, and from passage 34 through passage 82 to the seat of the slide valve 79 of the high pressure valve device 75. Since the diaphragm chamber 42 is connected to the passage 34 by passage 47, fluid also flows to the chamber 42. Fluid also flows to the serial release reservoir 11 from passage 34, through passage 48, past ball check valve 49, and passage 50. From passage 50, fluid flows past ball check valve 52 and through passage 53, to the annular chamber 45. From passage 50, fluid also flows through passage 51 to the valve chamber 78 of the high pressure valve device 75.

It will thus be noted that when the piston 14 of the triple valve device 8 is in release position, as shown in the drawing, and the auxiliary reservoir 7 is charged with fluid under pressure, piston chamber 33 and diaphragm chambers 42 and 45 of the quick service valve 10, the serial release reservoir 11, and valve chamber 78 of the high pressure valve device 75, are also charged with fluid under pressure, as supplied through the auxiliary reservoir pipe 20.

The valve chamber 36 of the quick service valve device 10 is charged with fluid under pressure from the brake pipe 6, through passage 37. Therefore, with the chambers 33 and 36 both charged with fluid under pressure in the manner described above, the piston 35 is held in release position, as shown in the drawing, by the spring stops 39 and 40.

The piston chamber 76 of the high pressure valve device 75 is charged with fluid under pressure from the brake pipe 6, through passage 37 and with the valve chamber 78 on the opposite side of the piston 77 charged with fluid under pressure as supplied through the auxiliary reservoir pipe 20, in the manner described above, the piston 77 is held seated against the seat rib 83, by heavy spring 80.

With the triple valve device 8 in release position, the brake cylinder 9 is connected to atmosphere, through pipe and passage 32, cavity 54 in the slide valve 16, and passage 55.

With the quick service valve device 10 in release position, chamber 46 above the diaphragm 41 is connected to atmosphere, through passage 56, cavity 57 in the slide valve 38, and passage 58.

Associated with the quick service valve device 10, is a reduction limiting reservoir 59 which is connected to atmosphere, when the equipment is in release position, through passage 60, valve cavity 57 and passage 58, passage 60 being provided with a restriction or choke 74.

When it is desired to effect a service application of the brakes, the brake pipe pressure is gradually reduced in the usual manner. When the brake pipe pressure has been sufficiently reduced in piston chamber 12 of the triple valve device 8 below that in valve chamber 18 on the other side of piston 14, the higher pressure on the auxiliary reservoir side of the piston 14 is able to overcome the friction of said piston and its attached auxiliary slide valve 17 and move these parts to the left until shoulder 61 on the end of the piston stem strikes against the right hand end of the main slide valve 16. In this position, the auxiliary slide valve 17 opens the port 62 in the slide valve 16.

In this initial movement, the feed groove 19 is closed, so that back flow from the auxiliary reservoir to the brake pipe is prevented.

Further movement of the piston 14 causes the movement of the main slide valve 16, but this movement requires a sufficient differential of pressures between the auxiliary reservoir and the brake pipe to overcome the frictional resistance of the main slide valve to movement.

The reduction in brake pipe pressure is also effective on the quick service valve device 10, and as soon as the pressure in valve chamber 36 has been sufficiently reduced below that in piston chamber 33 on the other side of the piston 35, the higher pressure on the auxiliary reservoir side of said piston is able to overcome the resistance of the spring stop 40 and move the piston 35 and slide valve 38 to the right. The movement of the slide valve 38 first closes the connection between the reduction reservoir 59 and the atmosphere, through passage 60 and the valve cavity 57, and then uncovers the passage 60, so that the valve chamber 36 is connected with the reduction reservoir 59. Fluid under pressure then flows from the brake pipe 6, through valve chamber 36, to the reduction reservoir 59, causing a quick local reduction in the brake pipe 6 and in the piston chamber 12.

Due to the action of the quick service valve device 10, the brake pipe pressure in piston chamber 12 is quickly reduced, so that the higher pressure on the auxiliary reservoir side of piston 14 is able to overcome the resistance of the main slide valve 16, and the movement of the piston 14 and slide valve 16 to the left is assured.

The movement of the main slide valve 16 closes the connection between the passage 32 and the cavity 54 which is connected with the exhaust port through passage 55, and brings uncovered port 62 into partial registration with passage 32. Fluid under pressure then flows from the auxiliary reservoir 7 to the brake cylinder 9, through port 62 and passage and pipe 32.

At the same time, the first movement of the auxiliary slide valve 17, connects two ports 63 and 64 in the main slide valve 16, through cavity 65 in the auxiliary slide valve 17, and the movement of the main slide valve 16 brings port 63 to register with port 66 in the slide valve seat, and port 64 with port 67. Consequently, fluid in chamber 27 flows through ports 66, 63, 65, 64 and 67, thence around the quick action piston 24, which fits loosely in its cylinder, to chamber 31 and to the brake cylinder.

When the pressure in chamber 27 has reduced below the brake pipe pressure remaining in chamber 68, the check valve 28 is raised and allows brake pipe fluid to flow past the check valve and through the ports 66, 63, 65, 64 and 67 to the brake cylinder. The size of these ports is so proportioned that the flow of fluid from the brake pipe to the top of the quick action piston 24, is not sufficient to force the piston 24 downward and thus cause an emergency application.

Since piston chamber 33 of the quick service valve device 10 is connected to the auxiliary reservoir 7, the pressure of fluid in said chamber reduces as fluid flows from the auxiliary reservoir to the brake cylinder in applying the brakes.

When the reduction of the pressure of fluid in piston chamber 33 approaches equalization with the reduced brake pipe pressure in valve chamber 36, on the opposite side of the piston 35, the spring stop 40 moves piston 35 and the slide valve 38 to the left toward release position.

The movement of the slide valve 38 first laps the passage 60, thereby closing the connection between the reduction limiting reservoir 59 and the brake pipe and then connects passage 60, through valve cavity 57, with the atmospheric passage 58, so that fluid in the reduction limiting reservoir 59 is vented to the atmosphere.

When the triple valve device moves to service position, fluid is vented from the auxiliary reservoir to the brake cylinder at a rate faster than the brake pipe pressure is reducing, so that the triple piston is soon moved by a preponderance of brake pipe pressure to lap position. As the reduction in brake pipe pressure continues however, the triple piston will again move to service application position and then back to lap and this movement between service and service lap positions continues so long as the reduction in brake pipe pressure continues.

It should be noted that the quick service valve device 10 returns to release position just prior to the triple valve assuming service lap position. As the reduction in brake pipe pressure proceeds, the quick service valve device 10 again takes up its quick service venting position and remains in this position approximately until the triple valve device, after having moved to service position, revice, returns again to service lap position. It will be noted, therefore, that the quick service valve device 10 functions not only to propagate a brake application throughout the train with great rapidity but also to vent the brake pipe locally throughout the train, thus reducing the quantity of fluid to be discharged at the engineer's brake valve, and insuring that effective braking action will be obtained quickly and uniformly throughout the train.

Fluid continues to flow from the auxiliary reservoir 7 through port 62 and passage 32 to the brake cylinder 9, until the pressure in the valve chamber 18 becomes enough less than that of the brake pipe to cause piston 14 and auxiliary slide valve 17 to move to the right until the shoulder 72 on the piston stem strikes the left hand end of the main slide valve 16.

As the friction of the piston 14 and auxiliary slide valve 17 is much less than that of the main slide valve 16, the difference in pressure which will move the piston and auxiliary slide valve, will not be sufficient to also move the main slide valve, consequently, the piston stops in the position in which the auxiliary slide valve 17 blanks port 62, thus cutting off any further flow of fluid from the auxiliary reservoir to the brake cylinder. In this position, the auxiliary slide valve 17 also blanks the port 63, thus preventing further flow of fluid from the brake pipe through the quick service ports. Consequently, no further change in fluid pressure can occur, since all ports are lapped.

If it is desired to make a heavier application, a further reduction in brake pipe pressure by manipulation of the engineer's brake valve (not shown) is made, and then the operation of the valve devices described above repeated, until the auxiliary reservoir and brake cylinder pressures become equalized.

It should be noted that the high pressure valve device 75 remains inactive when a service application of the brakes is initiated, since the spring 80 is of such value that a greater differential on piston 77 is required to compress spring 80 than is needed to move the pistons 14 and 35 of the triple valve device and quick service valve device, respectively.

When it is desired to release the brakes, the brake pipe pressure is increased in the usual way by moving the engineer's brake valve to full release position, which consequently increases the pressure of fluid in piston chamber 12 of the triple valve device 8 and in valve chamber 36 of the quick service valve device 10, so that the piston 14 is moved to the right toward its release position, while the piston 35 is moved toward the left.

The spring 39 is of such value that, normally, a greater differential on piston 35 is required to compress spring 39 than is needed to move piston 14 in the triple valve device to release position. In the ordinary case, therefore, piston 14 moves to release while piston 35 remains in its normal or running position. If, however, the increase in brake pipe pressure is sufficiently rapid, as is the case at the head end of the train, the differential on piston 35 is further increased because the feed groove 19 does not permit a sufficient flow of fluid to allow the pressure in the auxiliary reservoir 7 to increase at the same rate as brake pipe pressure increases in piston chamber 12. Consequently, piston 14 is forced further to the right compressing spring 22 and causing the triple valve device to take up the well known retarded release position.

When the increase in brake pipe pressure is sufficiently rapid to build up a differential on piston 14 causing it to move to retarded release position, it is obvious that spring 39 in the quick service valve device 10 can be given such a value that, under these circumstances, piston 35, which is subject to the same differential, will move to the left, compressing spring 39. Fluid from the serial release reservoir 11 is then permitted to flow to the brake pipe as will now be described.

When the piston 35 is moved to the left so as to compress the spring 39, slide valve 38 is moved to a position in which passage 56 is opened to the valve chamber 36. Fluid under pressure from valve chamber 36 and the brake pipe then flows through passage 56 to chamber 46 which is open to the inner seated area formed by the seat rib 44.

With release reservoir pressure in chamber 45, brake pipe pressure in chamber 46, and auxiliary reservoir pressure in chamber 42, the diaphragm 41 will be moved away from its engagement with seat rib 44, compressing the spring 43, since auxiliary reservoir pressure in chamber 42 will be lower than the brake pipe pressure, when the brakes are being released.

The movement of the diaphragm 41 away from the seat rib 44 connects chambers 45 and 46, and the serial release reservoir 11 is connected to the brake pipe 6 by way of passage 50, past check valve 52, passage 53, chamber 45, chamber 46, passage 69, past ball check valve 70, and passages 71 and 37, so that a sudden increase in brake pipe pressure is produced.

When the auxiliary reservoir pressure is built up to a sufficient degree, the spring stop 39 returns piston 35 and slide valve 38 of the quick service valve device 10 to release position.

In the retarded release position, cavity 54 in the main slide valve 16 registers with brake cylinder passage 32, while a passage 73 having a restricted flow capacity registers with atmospheric exhaust port 55. Fluid under pressure is therefore released from the brake cylinder at a restricted slow rate.

The movement of the piston 35 to the left so as to compress the spring 39 on cars adjacent to the engine, causes a local increase in brake pipe pressure which is transmitted to cars at the rear of the cars adjacent to the engine, so that the rate of increase in brake pipe pressure is sufficient to cause the triple valve devices to successively move to the retarded release position throughout the train, the pistons 35 of the quick service valve devices on the successive cars being moved to the quick serial release position, so as to vent fluid from the release reservoir 11 on each car to the brake pipe.

The release of the brakes throughout the train is thus accelerated, so that the release is more nearly simultaneous, thus avoiding severe shocks and possible danger of a break-in-two due to the running out of the slack.

Upon a sudden reduction in brake pipe pressure to effect an emergency application of the brakes, the triple valve piston 14 is quickly shifted toward the left to emergency position, in which the spring-pressed graduating stem 23 is forced back and the piston seals against the gasket 84.

With the piston 14 in emergency position, a passage 86 is uncovered by the main slide valve 16, thereby permitting flow of fluid from the auxiliary reservoir 7 to the quick action piston chamber 25. The quick action piston 24 is then operated to unseat the vent valve 26. The pressure in chamber 27 being thereby instantly relieved, allows brake pipe fluid to raise the check valve 28 and flow rapidly through chambers 27 and 31 to the brake cylinder, until brake cylinder and brake pipe pressures nearly equalize, when the check valve 28 is returned to its seat by the spring 29, preventing the pressure in the brake cylinder from flowing back into the brake pipe again. In this way a sudden local reduction in brake pipe pressure is produced which is transmitted serially throughout the train in the well known manner.

Also in emergency position of the triple valve device 8, a port 85 in the main slide valve 16 registers with the brake cylinder passage 32, and fluid under pressure in the auxiliary reservoir 7, as well as in the serial release reservoir 11, is thus permitted to equalize in the brake cylinder, as will be hereinafter more fully described.

When an emergency application of the brakes is initiated, the reduction in brake pipe pressure is also effective on the quick service valve device 10 and the high pressure valve device 75, and the quick service valve device 10 is actuated in the same manner as has been previously described in connection with a service application.

As soon as the pressure in piston chamber 76 of the high pressure valve device 75 has been sufficiently reduced below that in valve chamber 78 on the other side of the piston 77, the higher pressure on the serial release reservoir side of said piston is able to overcome the resistance of the spring 80 and move the piston 77 and slide valve 79 to the left and the piston seals against the gasket 87. In the movement of the piston 77 toward the left, the spring stop 81 also moves toward the left until further movement is prevented by the flange 88 on the spring stop engaging a shoulder 89 in the casing. In this position the end of the stem of the piston 77 is spaced from the left hand end of the spring stop 81.

When the piston 77 and slide valve 79 move toward the left, the slide valve uncovers the passage 82, so that the valve chamber 78 is connected with the auxiliary reservoir 7. Fluid under pressure then flows from the serial release reservoir 11, through passages 50 and 51, past the spring stop 81, to valve chamber 78, and thence through passages 84 and 34 and pipe 20, to the auxiliary reservoir 7, thereby permitting fluid under pressure in the serial release reservoir and the auxiliary reservoir to equalize in the brake cylinder and apply the brakes in emergency.

When it is desired to release the brakes after an emergency, the brake pipe pressure is increased in the usual way. When the brake pipe pressure effective on the inner seated area of the piston 77 of the high pressure valve device 75 has been increased a predetermined amount, the spring 80 moves the piston 77 and slide valve 79 to the right, until the end of the piston stem engages the spring stop 81, which is, as has been previously described, in a position to the left of that shown in the drawing. Further movement of the piston 77 and slide valve 79 toward the right, at this time, is thus prevented by the spring stop 81, and the piston is held in an intermediate position in which the valve chamber 78 on one side of the piston 77 is connected to the piston chamber 76 on the other side of said piston, through passage 90, around the piston.

Since the brake cylinder and auxiliary reservoir are connected to the valve chamber 78, through pipe 20, and passages 34 and 82, and since the serial release reservoir 11 is connected to the valve chamber 78, through passages 50 and 51, when the piston 77 is moved to the intermediate position, and the valve chamber 78 is connected, through passage 90, with piston chamber 76, fluid from the auxiliary reservoir, brake cylinder and serial release reservoir flows to the brake pipe, thereby quickly recharging the brake pipe.

As soon as the brake pipe pressure is thus further increased a predetermined amount, the spring 80 moves the piston 77 and slide valve 79 to the right until the piston seals against the seat rib 83, thereby cutting off the communication from the valve chamber 78 to the piston chamber 76, through the passage 90. In this movement of the piston 77, the spring stop 81 is also moved toward the right to the position shown in the drawing.

It is thus evident that my invention provides for a higher emergency brake cylinder pressure to be obtained when an emergency application of the brakes is made than has heretofore been obtained with the known devices, since the serial release reservoir 11 is connected with the auxiliary reservoir through the operation of the high pressure valve device 75.

Further, it will be observed that, after an emergency, when the brake pipe pressure is increased so as to effect the release of the brakes, should the triple valve piston 14 fail for any reason to promptly move to release position, the quick recharge of the brake pipe obtained by back dumping fluid from the brake cylinder, auxiliary reservoir and serial release reservoir into the brake pipe, as provided by my invention, will be effective in piston chamber 12, so that a higher differential in fluid pressure will be promptly created on the opposite sides of piston 14, and said piston will therefore be quickly moved to release position.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe, auxiliary reservoir, brake cylinder, and a triple valve device operated upon a sudden reduction in brake pipe pressure for venting fluid from the auxiliary reservoir to the brake cylinder to effect an emergency application of the brakes, of an additional reservoir, and a valve device subject to the opposing pressures of the brake pipe and said additional reservoir and operable upon a predetermined reduction in brake pipe pressure to connect the additional reservoir to a communication at all times open to the auxiliary reservoir, to thereby permit the equalization of the additional reservoir into the auxiliary reservoir.

2. In a fluid pressure brake, the combination with a brake pipe, auxiliary reservoir, brake cylinder, and a triple valve device operated upon a sudden reduction in brake pipe pressure for venting fluid from the auxiliary reservoir to the brake cylinder to effect an emergency application of the brakes, of an additional reservoir, a valve device subject to the opposing pressures of the brake pipe and said additional reservoir and operable upon a predetermined reduction in brake pipe pressure for venting fluid from the additional reservoir to the auxiliary reservoir until the additional reservoir has equalized into the auxiliary reservoir, and a spring for opposing movement of said valve device to vent fluid from the additional reservoir.

3. In a fluid pressure brake, the combination with a brake pipe, auxiliary reservoir, brake cylinder, and a triple valve device operated upon a sudden reduction in brake pipe pressure for venting fluid from the auxiliary reservoir to the brake cylinder to effect an emergency application of the brakes, of an additional reservoir, and a valve device operable upon a predetermined reduction in brake pipe pressure for controlling a communication through which fluid is vented from the additional reservoir to the auxiliary reservoir and operable upon an increase in brake pipe pressure for controlling a communication through which fluid is vented from said auxiliary reservoir and said additional reservoir to the brake pipe.

4. In a fluid pressure brake, the combination with a brake pipe, auxiliary reservoir, brake cylinder, and a triple valve device operated upon a sudden reduction in brake pipe pressure for venting fluid from the auxiliary reservoir to the brake cylinder to effect an emergency application of the brakes, of an additional reservoir, and a valve device comprising a piston subject to the opposing pressures of the brake pipe and said additional reservoir and operable upon a predetermined reduction in brake pipe pressure for controlling a communication through which fluid is vented from the additional reservoir to the auxiliary reservoir and operable upon an increase in brake pipe pressure for controlling a communication through which fluid is vented from said auxiliary reservoir and said additional reservoir to the brake pipe.

5. In a fluid pressure brake, the combination with a brake pipe, auxiliary reservoir, brake cylinder, and a triple valve device subject to the opposing pressures of the brake pipe and auxiliary reservoir and operated upon an increase in brake pipe pressure for releasing fluid from the brake cylinder, of an additional reservoir, and a valve device subject to the opposing pressures of the brake pipe and the additional reservoir and operated upon an increase in brake pipe pressure for venting fluid from the auxiliary reservoir and the additional reservoir to the brake pipe.

6. In a fluid pressure brake, the combination with a brake pipe, auxiliary reservoir, brake cylinder, and a triple valve device operated upon an increase in brake pipe pressure for releasing fluid from the brake cylinder, of an additional reservoir, and a valve device separate from the triple valve device and subject to the opposing pressures of the additional reservoir and brake pipe and operated upon an increase in brake pipe pressure for venting fluid from the auxiliary reservoir and additional reservoir to the brake pipe to hasten the operation of said triple valve device.

7. In a fluid pressure brake, the combination with a brake pipe, auxiliary reservoir, brake cylinder, and a triple valve device operated upon an increase in brake pipe pressure for releasing fluid from the brake cylinder, of an additional reservoir, a valve device subject to the opposing pressures of the brake pipe and additional reservoir and operated upon an increase in brake pipe pressure for venting fluid from the auxiliary reservoir and the additional reservoir to the brake pipe, and a spring for opposing movement of said valve device from the position for venting fluid from said reservoirs to the brake pipe.

8. In a fluid pressure brake, the combination with a brake pipe, auxiliary reservoir, brake cylinder, and a triple valve device operated upon an increase in brake pipe pressure for releasing fluid from the brake cylinder, of an additional reservoir, a valve device subject to the opposing pressures of the brake pipe and additional reservoir and operated upon an increase in brake pipe pressure for venting fluid from the auxiliary reservoir and additional reservoir to the brake pipe, and a spring for opposing movement of said valve device from the position for venting fluid from said reservoirs to the brake pipe and adapted to permit movement of the valve device only when the increase in brake pipe pressure is sufficient to cause the operation of said triple valve device to release position.

9. In a fluid pressure brake, the combination with a brake pipe, auxiliary reservoir, brake cylinder, and a triple valve device operated upon an increase in brake pipe pressure for releasing fluid from the brake cylinder, of an additional reservoir adapted to be charged with fluid under pressure from the auxiliary reservoir, a check valve for preventing back flow from the additional reservoir to the auxiliary reservoir, a valve device subject to the opposing pressures of the brake pipe and additional reservoir and operated upon an increase in brake pipe pressure for venting fluid from the auxiliary reservoir and additional reservoir to the brake pipe, and a spring for opposing movement of said valve device from the position for venting fluid from said reservoirs to the brake pipe and adapted to permit movement of the valve device only when the increase in brake pipe pressure is sufficient to cause the operation of said triple valve device to release position.

10. In a fluid pressure brake, the combination with a brake pipe, auxiliary reservoir, brake cylinder, and a triple valve device operated upon a sudden reduction in brake pipe pressure for venting fluid from the auxiliary reservoir to the brake cylinder to effect an emergency application of the brakes, of an additional reservoir adapted to be charged with fluid under pressure from the auxiliary reservoir, a check valve for preventing back flow from the additional reservoir to the auxiliary reservoir, and a valve device operative at a predetermined differential in pressures between the brake pipe and additional reservoir for supplying fluid under pressure from the additional reservoir to the auxiliary reservoir with the triple valve device in emergency application position.

11. In a fluid pressure brake, the combination with a brake pipe, auxiliary reservoir, brake cylinder, and a triple valve device operated upon an increase in brake pipe pressure for releasing fluid from the brake cylinder, of an additional reservoir adapted to be charged with fluid under pressure from the auxiliary reservoir, a check valve for preventing back flow from the additional reservoir to the auxiliary reservoir, means for venting fluid from the auxiliary reservoir and additional reservoir to the brake pipe, comprising a piston subject on one side to the pressure of a chamber connected to said additional reservoir and on the opposite side to the pressure of a chamber connected to the brake pipe, said piston being adapted to control communication through a passage connecting said chambers, and means carried by the piston for controlling communication from said first named chamber to the auxiliary reservoir, and a spring for opposing movement of said piston from the position for establishing communication between chambers and adapted to permit movement of said piston only when the increase in brake pipe pressure is sufficient to cause the operation of said triple valve device to release position.

12. In a fluid pressure brake, the combination with a brake pipe, auxiliary reservoir, brake cylinder, and a triple valve device operated upon an increase in brake pipe pressure for releasing fluid from the brake cylinder, of means for quickly recharging the brake pipe to effect the operation of said triple valve device, comprising an additional reservoir, a piston subject on one side to the pressure of a chamber connected to said additional reservoir and on the opposite side to the pressure of a chamber connected to the brake pipe, said piston controlling a communication through which both of said chambers are connected, means carried by the piston for controlling communication from said first named chamber to the auxiliary reservoir, and a spring for opposing movement of said piston from the position for establishing communication between said chambers and adapted to permit movement of said piston to a position in which the communication between said chambers is cut off only when the increase in brake pipe pressure is sufficient to cause the operation of said triple valve device to release position.

13. In a fluid pressure brake, the combination with a brake pipe, an auxiliary reservoir, an additional reservoir and a quick service valve device operated upon a reduction in brake pipe pressure for effecting a local reduction in brake pipe pressure, of a filling piece interposed between said additional reservoir and said valve device, and an emergency valve device carried by said filling piece and operated upon a predetermined reduction in brake pipe pressure for connecting said additional reservoir to the auxiliary reservoir, said filling piece having passages connecting said emergency valve device to the brake pipe and to the auxiliary reservoir.

JOSEPH C. McCUNE.